UNITED STATES PATENT OFFICE.

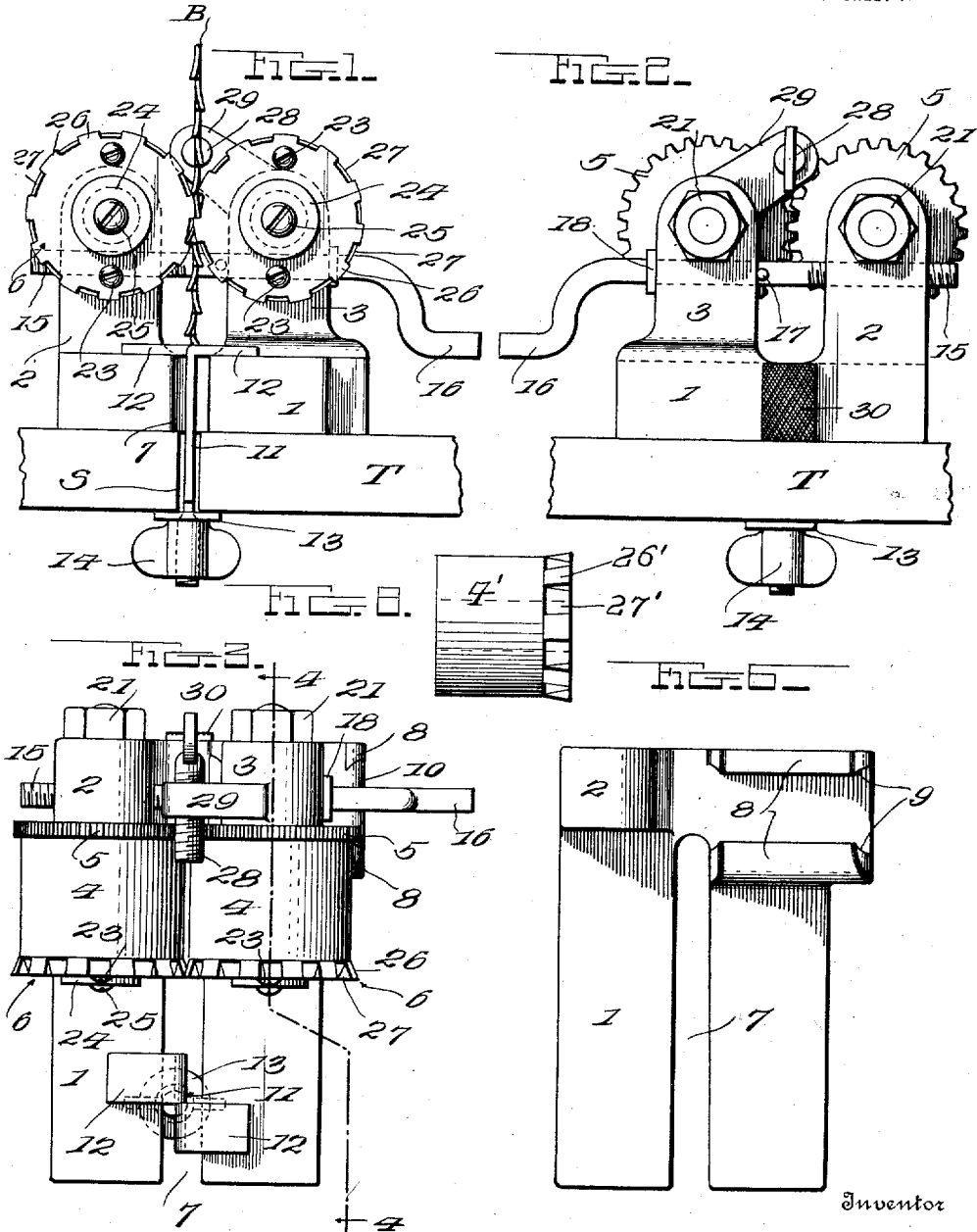

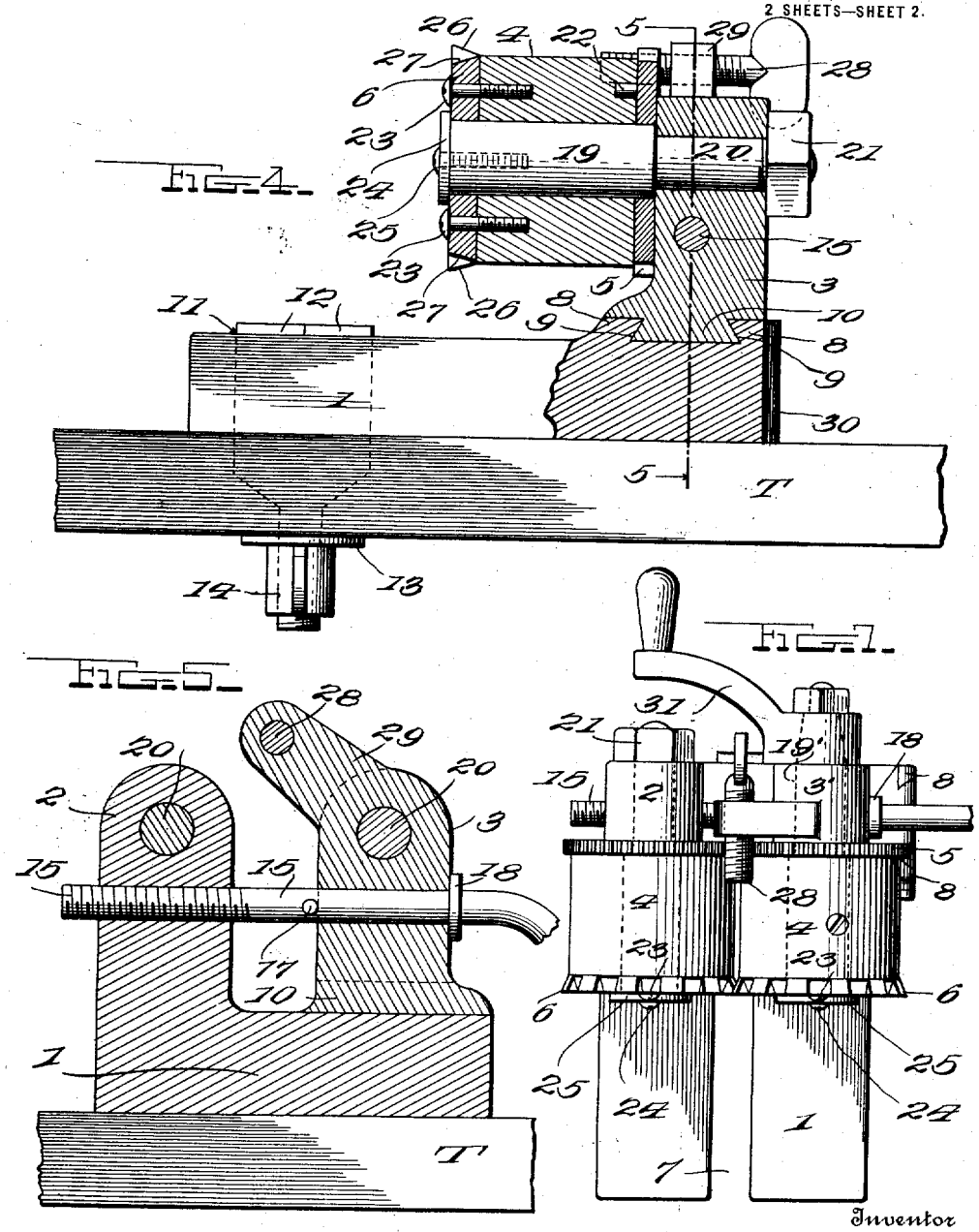

CHARLES S. BUSHELL, OF BELOIT, WISCONSIN, ASSIGNOR OF ONE-HALF TO ALFRED M. SCHROEDER, OF WILLIAMS BAY, WISCONSIN.

DEVICE FOR SETTING BAND-SAWS.

1,144,889.   Specification of Letters Patent.   Patented June 29, 1915.

Application filed June 15, 1914. Serial No. 845,312.

*To all whom it may concern:*

Be it known that I, CHARLES S. BUSHELL, a citizen of the United States, residing at Beloit, in the county of Rock and State of Wisconsin, have invented certain new and useful Improvements in Devices for Setting Band-Saws; and I do declare the following to be a full, clear, and exact description of the invention, such as will enable others skilled in the art to which it appertains to make and use the same.

This invention relates to improvements in saw sets and more particularly to those which are adapted for the setting of band saws.

The primary object of the invention is to provide an extremely simple, yet efficient machine of the character described, which will quickly and effectually set the teeth of a band saw, while the same is being run under its own power.

A secondary object is to provide an improved supporting base for the setting dies, said base being constructed in such a manner as to allow it to straddle the saw and to be clamped on the saw table.

To the above end, the invention resides in certain novel features of construction and combination herein described and claimed, and shown in the drawings, wherein:

Figure 1 is a side elevation of a portion of a band saw and its table, showing the application of my invention; Fig. 2 is a similar view looking from the opposite side of the machine; Fig. 3 is a plan view of the machine detached; Fig. 4 is a longitudinal section on the line 4—4 of Fig. 3; Fig. 5 is a transverse section on the line 5—5 of Fig. 4; Fig. 6 is a plan view of the attaching base; Fig. 7 is a plan view of the machine showing a slightly modified form of construction; and Fig. 8 is a side elevation showing a slightly different form of guide roller and tooth setting die.

In the accompanying drawings, I have shown my invention as applied to a band saw, the latter comprising the usual table T and the continuous saw blade B, said table having the usual slit S through which said blade B operates. The construction of the band saw forms no part of the present invention, but the slit S therein closely coacts with my improved setting machine, as will hereinafter appear.

Coming now to details of the present invention, I have shown my improved band saw setting machine as comprising a base 1, fixed and movable standards 2 and 3 rising therefrom, rollers 4 revolubly supported by said standards, gears 5 for rotating said rollers in unison, and rotary dies 6 which are designed to bend the teeth of the saw blade B in opposite directions in a manner to appear.

The base 1 is here shown as being of rectangular formation and provided with a longitudinal slit 7 which is adapted to register with the slit S in the table T when the machine is in position on the latter. One end of the base is provided with upstanding flanges 8 which extend transversely thereof throughout approximately one-half of its width, said flanges being under cut as at 9 to provide a dove-tail passage in which a dove-tail key 10 which is rigidly carried by the lower side of the movable standard 3 is adapted to travel and to be forced nearer or farther from the fixed post 2, which is here shown as rising from the corner of the base 1 opposite the flanges 8, and is preferably, though not necessarily, formed integral with said base. The base 1 and the parts carried thereby are secured in position upon the table T by means of a clamp 11, which is provided with laterally extending flanges 12, which overlie said base on opposite sides of the slit 7, the shank of said clamp depending through said slit and the slit S in said table and receiving a washer 13 and a clamping nut 14.

For the purpose of adjusting the movable jaw 3 between the flanges 8, I provide an adjusting screw 15 which passes loosely through said movable standard and is threaded into the fixed standard 2, its free end being provided with a suitable crank 16 by means of which it may be rotated. In order to prevent the screw 15 from shifting within the smooth bore of the standard 3, I provide a transverse pin 17 on one side of said standard 3 and a collar 18 on the opposite side thereof, both of the latter being carried rigidly by said screw. By this construction, it will be readily seen that when the crank 16 is turned, the movable jaw 3 will be adjusted toward or farther away from the fixed jaw 2, according to the direction of rotation. The jaw 3 is rendered adjustable toward the jaw 2 for a purpose to be hereinafter set forth.

Projecting horizontally from each of the standards 2 and 3 and overlying the body portion of the base 1, is a bearing pintle 19, said pintles being preferably secured to said standards by reducing their ends as at 20, passing said reduced ends through said standards, and threading nuts 21 thereon. The rollers 4 are revolubly mounted upon the pintles 19, as clearly shown in the drawings, and the gears 5 are carried rigidly by the inner ends of said rollers, the rigid relation between said rollers and said gears being effected by providing each gear 5 with an inwardly extending stud 22 which is adapted to enter a similarly shaped opening in the inner end of each of said rollers. Thus it will be seen that said rollers will revolve in unison, when the machine is in operation, as will be hereinafter set forth.

The setting dies 6 are of annular formation and are secured to the outer ends of the rollers 4 by means of screws 23 which are passed therethrough and into threaded sockets in the outer ends of said rollers, the gears 5, the rollers 4, and the dies 6 being held rotatably upon the pintles 19 by means of washers 24 and screws 25, the latter passing through said washers and being threaded in sockets formed in the outer ends of the pintles 19, it being understood that the washers 24 are of greater diameter than the openings within the various elements mounted on said pintles. Each die 6 is provided on its periphery with a plurality of alternately disposed teeth and notches 26 and 27, the teeth of one die engaging the notches of the other die, as the parts are rotated. As clearly shown in the drawings, the outer edges of the teeth 26 are spaced a greater distance from the centers of the dies 6 than the inner edges thereof, the peripheries of said teeth inclining from said outer toward their inner edges. It will also be noted that the inner walls of the notches 27 incline from the periphery of the rollers 4 toward the center of said dies. By this formation of the notches and teeth, the proper inclination will be given to each tooth of the saw blade B in a manner to appear.

For the purpose of guiding the blade B, I provide a set screw 28 which is threaded through a boss 29, the latter rising rigidly from the movable standard 3 and overlying the space between the gears 5.

The operation of the device so far described, is as follows: The teeth of the saw blade B are first run over a file, which latter may well be carried by one end of the base T as shown at 30, whereupon said base is clamped upon the table with its slit 7 straddling said blade. The movable standard 3 which now stands retracted, is moved toward the standard 2 through the action of the screw 15 and the crank 16, this operation bringing the rollers 4 into contact with the opposite sides of the blade B, meshing the teeth of the gears 5, and correctly positioning the teeth 26 in respect to the teeth of the blade B. The set screw 28 is now rotated in the proper direction to cause its inner end to contact with the smooth edge of said saw blade, which latter, may now be set in motion by the power employed in running the same or by other suitable means. The blade B in descending on the side in which the setting machine is in operation, will cause its teeth to contact with the die teeth 26 and will thus rotate said dies, the rollers 4 and gears 5, this operation effectually bending the teeth of the blade in opposite directions.

From the above description, it will be seen that the teeth of a band saw may be readily set without the necessity of removing said saw from the machine on which it is employed. This feature is extremely advantageous and is a great improvement over devices of the character now on the market.

In setting some forms of band saws, as for instance, those which are normally driven by means too powerful for use in connection with saw setting machines, it becomes expedient to drive one of the rollers 4 and the parts carried thereby by hand. For this purpose, I have shown in Fig. 7 an adequate means for performing this function, said means consisting of a crank 31 which is rigidly secured to one end of the pintle 19' which is in this case, journaled through the movable post 3' and rigidly carries the roller 4, gear 5, and die 6. The operation of the crank 31 will cause the roller 4 and its co-acting parts to be rotated, and this action will drive the rotating parts on the opposite side of the machine, and will draw the blade B downwardly, the setting operation being precisely the same as in the form previously described.

From the above description, it will be readily seen that in the first form of the invention, the saw blade B drives the teeth setting mechanism, while in the second form, the setting mechanism moves the saw blade.

I wish to lay particular stress on the specific construction of the base 1 and the mounting of the rollers 4, since by the construction herein described, it is not necessary to remove the saw blade from the machine as above mentioned.

In Fig. 8, I have shown a roller 4' adapted to be mounted in the same manner as the rollers 4, said roller having alternately disposed teeth and spaces 26' and 27' respectively, the formation of the teeth and the inclination of the spaces therebetween being identical with the form previously described.

Having thus described my invention, what I claim as new and desire to secure by Letters Patent is:

The combination with a base, an integral standard rising from one corner of said base, and a transverse groove with inwardly projecting upper side edges formed on the other corner of the base, a standard with a dovetailed lower end adapted to be slidably mounted in said groove, a transverse rod through the two standards adapted to move the slidable standard to and from the integral standard on the same plane therewith, a pair of parallel stub shafts projecting horizontally from the standards and carrying saw engaging rollers overlying the base, a pair of interengaging dies on the outer ends of said rollers and a pair of intermeshing gears on their inner ends, of an upwardly and inwardly extending integral ear having a horizontally extending threaded opening near its outer edge, said ear projecting from the slidable standard, and a set screw with a smooth inner end engaging through said opening in the ear projecting from the slidable standard and held thereby above but between the rollers to engage the smooth edges of the saws being set.

In testimony whereof I have hereunto set my hand in presence of two subscribing witnesses.

CHARLES S. BUSHELL.

Witnesses:
H. W. ADAMS,
ZULA VOSBURGH.

Copies of this patent may be obtained for five cents each, by addressing the "Commissioner of Patents, Washington, D. C."